United States Patent Office 3,501,268
Patented Mar. 17, 1970

3,501,268
PROCESS FOR THE PRODUCTION OF ANHYDROUS HYDROGEN FLUORIDE
Roy J. Laran, Greenwell Springs, and Albert P. Giraitis and Paul Kobetz, Baton Rouge, La., assignors to Ethyl Corporation, New York, N.Y., a corporation of Virginia
No Drawing. Filed May 18, 1967, Ser. No. 639,271
Int. Cl. C01b 7/22
U.S. Cl. 23—153                              2 Claims

ABSTRACT OF THE DISCLOSURE

The present invention relates to an integrated process for the production of hydrogen fluoride, trichlorofluoromethane, and dichlorodifluoromethane via the intermediate production of ammonium bifluoride. Ammonium bifluoride is prepared by the decomposition of ammonium cryolite, which latter compound results from the reaction of aluminum sulfate and ammonium fluoride, aluminum oxide and ammonium fluoride, or aluminum fluoride and ammonium fluoride. Ammonium fluoride and aluminum fluoride may be prepared, in turn, by reaction of fluosilicic acid with ammonia and aluminum hydroxide, respectively. The principal intermediate compound of the present invention, ammonium bifluoride, may be utilized either to prepare hydrogen fluoride by reaction with sulfuric acid or as a direct fluorinating agent for preparing trichlorofluoromethane and dichlorodifluoromethane by reaction with carbon tetrachloride in the presence of a catalyst.

BACKGROUND OF THE INVENTION

The phosphoric rock fertilizer industry has long been plagued by the problem of what to do with by-products fluorine compounds, chiefly fluosilicic acid from phosphate rock acidulation. The use of fluorine compounds as fluorinating agents, especially gaseous fluorine and hydrogen fluoride, has been steadily increasing and sources of supply therefor are much sought after. The present invention, in direct answer to this problem, not only provides a new source of hydrogen fluoride, but also presents a new fluorinating agent.

Accordingly, it is a principal object of the present invention to provide an improved process for recovering fluorinating agents from fluosilicic acid.

It is a further object of the present invention to provide an integrated process for recovering ammonium bifluoride and hydrogen fluoride from fluosilicic acid, which process in addition to presenting a lower cost for raw materials, is generally simpler and more direct from the standpoint of engineering, construction, and operation than prior art processes.

An additional object of the present invention is to utilize ammonium bifluoride and/or hydrogen fluoride to fluorinate chlorinated hydrocarbons to produce chlorofluorohydrocarbons such as trichlorofluoromethane and dichlorofluoromethane.

Other objects and features of the present invention will now in part be obvious and will in part appear hereinafter.

SUMMARY OF THE INVENTION

The present invention provides a method for the production of trichlorofluoromethane and dichlorodifluoromethane comprising reacting ammonium bifluoride with carbon tetrachloride in the presence of a catalyst to produce a product mixture comprising trichlorofluoromethane, dichlorodifluoromethane, ammonium chloride and hydrogen chloride, and separating said trichlorofluoromethane and dichlorodifluoromethane from the remainder of said product mixture. The ammonium bifluoride is produced by thermally decomposing ammonium cryolite to produce a product mixture comprising aluminum fluoride, ammonium bifluoride and ammonia, and separating said ammonium bifluoride from the remainder of said product mixture. The ammonium cryolite is produced by reacting aluminum sulfate and ammonium fluoride, aluminum oxide and ammonium fluoride, or ammonium fluoride and aluminum fluoride. The aluminum fluoride is produced by reacting fluosilicic acid with aluminum hydroxide; the ammonium fluoride is produced by reacting fluosilicic acid with ammonia. Aluminum fluoride may also be produced from the dissociation products of ammonium cryolite.

The present invention also provides a method for the production of hydrogen fluoride comprising reacting ammonium bifluoride with sulfuric acid to produce hydrogen fluoride and ammonium sulfate and separating said hydrogen fluoride from said ammonium sulfate.

DESCRIPTION OF THE PREFERRED EMBODIMENTS

In accordance with the process of the present invention an integrated process utilizing the following reactions is practiced:

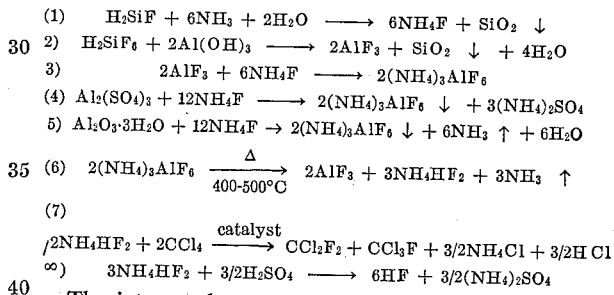

(1) $H_2SiF_6 + 6NH_3 + 2H_2O \longrightarrow 6NH_4F + SiO_2 \downarrow$ (2) $H_2SiF_6 + 2Al(OH)_3 \longrightarrow 2AlF_3 + SiO_2 \downarrow + 4H_2O$ (3) $2AlF_3 + 6NH_4F \longrightarrow 2(NH_4)_3AlF_6$ (4) $Al_2(SO_4)_3 + 12NH_4F \longrightarrow 2(NH_4)_3AlF_6 \downarrow + 3(NH_4)_2SO_4$ (5) $Al_2O_3 \cdot 3H_2O + 12NH_4F \rightarrow 2(NH_4)_3AlF_6 \downarrow + 6NH_3 \uparrow + 6H_2O$ (6) $2(NH_4)_3AlF_6 \xrightarrow[400-500°C]{\Delta} 2AlF_3 + 3NH_4HF_2 + 3NH_3 \uparrow$ (7) $2NH_4HF_2 + 2CCl_4 \xrightarrow{catalyst} CCl_2F_2 + CCl_3F + 3/2NH_4Cl + 3/2HCl$ (∞) $3NH_4HF_2 + 3/2H_2SO_4 \longrightarrow 6HF + 3/2(NH_4)_2SO_4$ The integrated process of the present invention offers a number of advantages not to be found in other commercial processes having similar objectives. It provides two fluorinating agents, hydrogen fluoride and ammonium bifluoride, in high yields and by high conversions of the reactants. Not only does the present invention provide an economical route for the production of fluorinating agents, but it also provides for the easy recovery of a number of valuable, relatively pure, by-products. Each of the steps of the present integrated process is relatively simple, and all of the reaction times are fairly short. A definite advantage in the sixth and eighth reactions is that no water is present as is the usual case in the production of aluminum fluoride and hydrogen fluoride. Consequently, it is a considerable economic advantage in the present integrated process in having little or no water removal. Also, the present process produces hydrogen fluoride using only half the normal quantity of sulfuric acid compared to other commercial processes such as that involving calcium fluoride-sulfuric acid reactions.

In accordance with the integrated process of the present invention, fluosilicic acid, in an aqueous solution, is first treated with ammonia or ammonium hydroxide to produce ammonium fluoride as expressed in Equation 1:

$$H_2SiF_6 + 6NH_3 + 2H_2O \rightarrow 6NH_4F + SiO_2\downarrow$$

This reaction is conducted at temperatures of 25° C. to 75° C. with the fluosilicic acid being present in an initial concentration of 5 to 30 weight percent. Preferably, the ammonia or ammonium hydroxide reactant is added to the fluosilicic acid to produce a reaction with is relatively short, being complete when the neutral point is reached.

The solid products of this reaction, such as silicon dioxide, are removed by any suitable means such as filtration, thus leaving the ammonium fluoride remaining in solution.

In an additional reaction involving fluosilicic acid, aluminum hydroxide is provided as a reactant according to Equation 2:

$$H_2SiF_6 + 2Al(OH)_3 \rightarrow 2AlF_3 + SiO_2\downarrow + 4H_2O$$

This reaction also produces silicon dioxide which may be removed as above explained in relation to Reaction 1. The aluminum fluoride produced is, like ammonium fluoride, soluble in an aqueous solution. This reaction is carried out at a temperature of 90° C. to 100° C. Fluosilicic acid, present in a concentration of about 5 to 30 weight percent, is preheated to 70° C. and aluminum hydroxide is added thereto. The reaction time is again relatively short taking only about 10 to 25 minutes.

According to the next reaction of the present integrated process, ammonium fluoride from Reaction 1 and aluminum fluoride from Reaction 2 are reacted to produce ammonium cryolite according to Reaction 3:

$$2AlF_3 + 6NH_4F \rightarrow 2(NH_4)_3AlF_6$$

The present process is of course not limited to ammonium fluoride and aluminum fluoride produced in the manner disclosed. Reaction 3 is especially advantageous since both reactants are utilized as dilute solutions and there is no need to extract water from either reactant since ammonium cryolite is insoluble and may be extracted from the reactant solution by filtration or comparable means. This reaction is conducted at a temperature of about 25° C. to about 100° C. and, in a preferred mode of addition, aluminum fluoride solution is added to ammonium fluoride solution, though the opposite sequence of addition can be practiced with good results. A digestion time of about 10 to about 60 minutes is required for substantial completion of the reaction.

The present invention also envisions two alternate routes for making ammonium cryolite. According to Reaction 4:

$$Al_2(SO_4)_3 + 12NH_4F \rightarrow 2(NH_4)_3AlF_6\downarrow + 3(NH_4)_2SO_4$$

In practicing this reaction, both aluminum sulfate and ammonium fluoride are preferably dissolved separately and combined. The mode of addition is not important. A precipitate immediately results. Preferably the mixture is stirred for about ten minutes, slightly heated, and then cooled to about 10° C. to minimize product loss through solubility. The precipitate, ammonium cryolite, may next be filtered out using procedures well known in the art and washed and dried. A quantitative yield above 90 percent pure is recovered.

The second alternate route for making ammonium cryolite is in Reaction 5:

$$Al_2O_3 \cdot 3H_2O + 12NH_4F \rightarrow 2(NH_4)_3AlF_6\downarrow + 6NH_3\uparrow + 6H_2O$$

In accordance with the process of this reaction, aluminum oxide and ammonium fluoride are preferably combined in water. The resulting mixture is then heated to about 75° C. to 85° C. and stirred until all ammonia has evolved. Ammonium cryolite precipitates and may be filtered, washed and dried in the usual fashion. The ammonia is a valuable product and may be recycled for use in Reaction 1, supra.

After ammonium cryolite is extracted from the aqueous reaction solution of Reactions 3, 4, or 5 and is preferably dried until substantially all water is removed, then it is heated to a temperature of from about 400° C. to about 500° C., resulting in the production of anhydrous products—aluminum fluoride, ammonium bifluoride, and ammonia in accordance with Reaction 6:

$$2(NH_4)_3AlF_6 \rightarrow 2AlF_3 + 3NH_4HF_2 + NH_3\uparrow$$

The ammonia is a valuable product and may be recovered for other use or recycled for use in Reaction 1, supra. The anhydrous aluminum fluoride is also a valuable product having commercial uses not available to the aqueous aluminum fluoride produced in Reaction 2. The thermal decomposition of the ammonium cryolite is relatively fast, taking only about one hour, and the ammonium bifluoride produced thereby can be conveniently separated from the ammonia since the ammonium bifluoride is a white crystalline deliquescent solid at room temperature and the ammonis is a gas. The ammonium bifluoride thus produced is suitable for use as a fluorinating agent for fluorinating chlorinated hydrocarbons as will be shown subsequently. However, the ammonium bifluoride thus produced may also be used according to the integrated process of the present invention in order to produce anhydrous hydrogen fluoride, a valuable fluorinating agent.

The reaction of hydrogen fluoride with chlorinated hydrocarbons to produce chlorofluorohydrocarbons is well known in the art and will not be further described herein. However, the use of ammonium bifluoride as a fluorinating agent can be profitably described. Thus, according to Reaction 7 of the integrated process:

$$3/2NH_4F_2 + 2CCl_4 \rightarrow CCl_2F_2 + CCl_3F + 3/2NH_4Cl + 3/2HCl$$

It is advantageous to conduct this reaction at a temperature of from about 200° C. to about 350° C. Carbon tetrachloride is added to ammonium bifluoride as a liquid, and the reaction takes place in the presence of a catalyst such as antimony pentachloride. Other catalysts may be conveniently used, such as lead oxide, zirconium fluoride, arsenic chloride, and chromium oxide. The reaction produces dichlorodifluoromethane, trichloromonofluoromethane, ammonium chloride, and hydrogen chloride. The ratio of dichlorodifluoromethane to trichloromonofluoromethane may be adjusted by control of the tempertaure of the reaction and by recycle of trichloromonofluoromethane and carbon tetrachloride to get more dichlorodifluoromethane. As desired, the reaction may be practiced batchwise or as a continuous process.

Hydrogen fluoride, just noted to be a valuable fluorinating agent, may be produced according to the present integrated process in accordance with Reaction 8:

$$3NH_4HF_2 + 3/2H_2SO_4 \rightarrow 6HF + 3/2(NH_4)_2SO_4$$

This reaction is conducted at a temperature of from about 150° C. to about 250° C. and employs anhydrous ammonium bifluoride and concentrated sulfuric acid. A preferred mode of addition is sulfuric acid to ammonium bifluoride. The reaction is relatively fast and proceeds to completion in from about 15 to about 60 minutes to produce anhydrous hydrogen fluoride and ammonium sulfate, the latter product being valuable as a fertilizer.

Having thus set forth the present invention, the following examples are presented as being illustrative of the practice thereof and the benefits to be achieved thereby.

EXAMPLE I

Reaction 1 as above set forth was practiced in the following manner: 31.45 grams of 31.0 weight percent fluosilicic acid solution was diluted with water to 75 milliliters. Ammonia was added until the solution reached an acidity of pH 8. The silicon dioxide precipitate was easily filtered and washed with 250 milliliters portions of water, and the ammonium fluoride solution was analyzed for residual fluosilicic acid. Analysis showed that reaction to ammonium fluoride was 96.4 percent complete.

The reaction was also carried out without the prior dilution of the fluosilicic acid solution by utilizing several water washes so that the resultant ammonium fluoride solution was in about 20 percent concentration. Several washes were required to completely remove the ammonium fluoride from the silicon dioxide. Analysis of the silicon dioxide after such a procedure showed only 0.014 weight percent fluorine value remaining in the silicon dioxide precipitate.

EXAMPLE II

Reaction 2 as above set forth was practiced in the following manner: 58.6 grams of 31.5 weight percent fluosilicic acid was diluted with 50 milliliters of water preheated to 70° C. Then, 20.0 grams of aluminum hydroxide was added slowly, and the temperature was increased to 87° C. over a 15 minute period and finally to 100° C. The temperature was maintained at 90 to 100° C. for another 10 minutes; then the mixture was filtered hot, and washed 3 times with 50 milliliter portions of water. The yield of aluminum fluoride was determined by conversion to cryolite with sodium fluoride. 30.1 grams of sodium fluoride was added to the pure solution and 50.1 grams of cryolite was obtained on drying. This represented a yield of 93.1 percent aluminum fluoride.

EXAMPLE III

Reaction 3, supra, was practiced in the following manner: 50.0 grams of 31.5 percent fluosilicic acid was combined with ammonia as in Example I, supra, to prepare ammonium fluoride in solution. A similar amount of fluosilicic acid was diluted with 135 milliliters of water. Then 18.76 grams of aluminum hydroxide was slowly added to produce aluminum fluoride in solution. The pH of the ammonium fluoride filtrate was adjusted to 6 by addition of sulfuric acid. The ammonium fluoride and aluminum fluoride solutions were combined by addition of the aluminum fluoride solution to the ammonium fluoride solution. 37.45 grams of solids was obtained after drying; this represented a 87.7 percent yield of ammonium cryolite. 2.68 grams of solids remained in the pipe. Aluminum and fluoride analysis of the solids for aluminum fluoride showed a minimum of 98 percent pure aluminum fluoride.

EXAMPLE IV

Reaction 4, supra, was practiced as follows: reagent grade aluminum sulfate and ammonium fluoride were used. 33.75 grams aluminum sulfate and 24.0 grams ammonium fluoride were dissolved separately and combined (order not important) to give a precipitate with a total mixture volume of 140 milliliters. After about 10 minutes of stirring and slight heating, the mixture was cooled to 10° C. to minimize product loss by solubility. The mixture was filtered cold, washed once with 50 milliliters of cold water, then acetone washed and dried at room temperature. A quantitative yield was obtained, and the ammonium cryolite was found to be 91 percent pure by both ammonia and fluorine analyses.

EXAMPLE V

Reaction 5, supra, was carried out thusly: 8.0 grams aluminum oxide was combined with 26.1 grams ammonium fluoride in about 75 milliliters water. The mixture was heated and stirred until practically all of the ammonia had evolved. Then it was cooled, filtered, and washed with 50 milliliters cold water. The reaction mixture was kept between 50 and 90 milliliters to aid in the expulsion of ammonia, at a temperature of 75–85° C. The filtered solid was acetone rinsed and dried at 60–90° C. 16.8 grams of dried material was obtained. Analysis showed a minimum purity of 93.8 percent. This represented an 84 percent yield of ammonium cryolite.

EXAMPLE VI

Reaction 6, supra, was practiced in the following manner: a 57 gram sample of ammonium cryolite was placed in a ¾ inch nickel pipe 13 inches long. The pipe was electrically heated to 400° C. under a nitrogen sweep for 1½ hours. 2.68 grams of solids remained in the pipe. Aluminum and fluoride analysis of the solids for aluminum fluoride showed a minimum of 98 percent pure aluminum fluoride. The recovery of the by-product gases as ammonium bifluoride and ammonia was carried out as follows: 6.00 grams of ammonium cryolite was heated to 500° C. for 2 hours and was connected to a stainless steel U-shaped trap thermostatted at 130° C. Scrubbers containing sulfuric acid and potassium hydroxide solutions were connected to the thermostatted trap. Analysis of the trap and scrubber contents indicated a 84.8 percent of theory recovery of ammonium bifluoride.

EXAMPLE VII

Reaction 7, supra, was carried out as follows: 70 grams of $SbCl_5$ and 20 grams of $NH_4HF_2$ were charged into a 250 milliliter reactor. At a temperature of 90° C. a pressure of 400 p.s.i.g. was developed. The gas inside the reactor was vented through a KOH scrubber and found by analysis to be hydrogen chloride, indicating a substitution reaction had occurred. 54 grams $CCl_4$ was then added to the cooled reactor and the temperature increased to 275° C. for about 2⅓ hours during which a pressure of 730 p.s.i.g. developed. Venting the reactor content into a trap at −50° C. resulted in recovery of 63 percent of the vented gases and analysis showed the trap to contain 87 weight percent $CCl_3F$, 10 weight percent $CCl_2F$ and 3 weight percent unreacted $CCl_4$.

EXAMPLE VIII

Reaction 8, supra, was practiced accordingly: 5.7 grams of dried 98.8 percent pure ammonium bifluoride was placed in a Hastelloy feed reactor. 5.5 grams of concentrated sulfuric acid was added to the reactor at 100° C. The temperature was increased to 200° C. for 30 minutes under nitrogen sweep. Analysis of a trap for fluorine content showed 3.59 grams as hydrogen fluoride, thus giving a 89.8 percent yield of hydrogen fluoride.

It is to be understood that the invention is not limited by the specific examples and embodiments described hereinabove, but includes such changes and modifications as may be apparent to one skilled in the art upon reading the appended claims.

What is claimed is:

1. A method for the production of anhydrous hydrogen fluoride comprising, in combination, the steps of, reacting aqueous fluosilicic acid with ammonia to produce ammonium fluoride and silicon dioxide, separately recovering said ammonium fluoride and reacting it with aluminum oxide to produce ammonium cryolite and ammonia, recovering and thermally decomposing said ammonium cryolite at a temperature of from about 400° C. to about 500° C. to produce a mixture comprising aluminum fluoride, ammonium bifluoride and ammonia, recovering said ammonium bifluoride from said mixture and reacting it with sulfuric acid to produce anhydrous hydrogen fluoride and ammonium sulfate, and recovering said anhydrous hydrogen fluoride separately from said ammonium sulfate.

2. A method for the production of anhydrous hydrogen fluoride comprising, in combination, the steps of, reacting aqueous fluosilicic acid with ammonia to produce ammonium fluoride and silicon dioxide, separating said ammonum fluoride and reacting it with aluminum fluoride to produce ammonium cryolite, thermally decomposing said ammonium cryolite at a temperature of from about 400° C. to about 500° C. to produce a mixture comprising aluminum fluoride, ammonium bifluoride and ammonia, separately recovering said ammonium bifluoride and said aluminum fluoride from said mixture and recycling said aluminum fluoride to be reacted with said ammonium fluoride, reacting said ammonium bifluoride with sulfuric acid to produce anhydrous hydrogen fluoride and ammonium sulfate, and recovering said anhydrous hydrogen fluoride separately from said ammonium sulfate.

(References on following page)

References Cited

UNITED STATES PATENTS

| | | | |
|---|---|---|---|
| 2,916,352 | 12/1959 | Fitch et al. | 23—88 |
| 2,981,597 | 4/1961 | Tarbutton et al. | 23—88 |
| 2,981,601 | 4/1961 | Kidde | 23—88 XR |
| 3,005,684 | 10/1961 | Riedl et al. | 23—88 |
| 3,057,681 | 10/1962 | Gernes et al. | 23—88 |
| 3,128,152 | 4/1964 | Secord et al. | 23—153 |
| 3,175,882 | 3/1965 | Derr | 23—88 |
| 3,195,979 | 7/1965 | Burkert et al. | 23—153 |

FOREIGN PATENTS

| | | |
|---|---|---|
| 16,887 | 1890 | Great Britain. |
| 423,601 | 2/1935 | Great Britain. |
| 425,908 | 3/1935 | Great Britain. |
| 635,552 | 4/1950 | Great Britain. |
| 635,553 | 4/1950 | Great Britain. |
| 782,423 | 9/1957 | Great Britain. |

EDWARD STERN, Primary Examiner

U.S. Cl. X.R.

23—88, 100, 119, 154, 193; 260—653.8